US010671527B2

United States Patent
Kim et al.

(10) Patent No.: US 10,671,527 B2
(45) Date of Patent: Jun. 2, 2020

(54) DATA STORAGE DEVICE AND METHOD FOR OPERATING THE SAME

(71) Applicant: SK hynix Inc., Gyeonggi-do (KR)

(72) Inventors: Yong Tae Kim, Seoul (KR); Duck Hoi Koo, Gyeonggi-do (KR); Soong Sun Shin, Gyeonggi-do (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/830,957

(22) Filed: Dec. 4, 2017

(65) Prior Publication Data

US 2019/0018768 A1    Jan. 17, 2019

(30) Foreign Application Priority Data

Jul. 11, 2017  (KR) .................. 10-2017-0087665

(51) Int. Cl.
*G06F 12/02*      (2006.01)
*G06F 12/0804*    (2016.01)
*G06F 3/06*       (2006.01)

(52) U.S. Cl.
CPC .......... *G06F 12/0253* (2013.01); *G06F 3/061* (2013.01); *G06F 3/064* (2013.01); *G06F 3/0652* (2013.01); *G06F 3/0679* (2013.01); *G06F 3/0685* (2013.01); *G06F 12/0804* (2013.01);

(Continued)

(58) Field of Classification Search
CPC ..................... G06F 12/0253; G06F 2212/7205
See application file for complete search history.

(56) References Cited

U.S. PATENT DOCUMENTS

2013/0159815 A1* 6/2013 Jung .................. G06F 11/10
                                                714/773
2013/0173875 A1* 7/2013 Kim .................. G06F 12/0246
                                                711/160

(Continued)

FOREIGN PATENT DOCUMENTS

KR        101067018        9/2011

OTHER PUBLICATIONS

Lee et al. "Buffer-Aware Garbage Collection for Nand Flash Memory-Based Storage Systems" (Year: 2008).*

(Continued)

*Primary Examiner* — Edward J Dudek, Jr.
*Assistant Examiner* — Andrew Russell
(74) *Attorney, Agent, or Firm* — IP & T Group LLP

(57) ABSTRACT

A method for operating a data storage device including a non-volatile memory device including a first region and a second region includes: storing data from a data cache memory in memory blocks in the first region; determining a first garbage collection cost with respect to a first target memory block having the least valid page among the memory blocks in the first region in which the data are kept; determining a second garbage collection cost with respect to a second target memory block having the least valid page among the memory blocks in the first region from which the data are cleared; and performing a garbage collection operation to copy valid data of a garbage collection target memory block into memory blocks in the second region based on a comparison result of the first garbage collection cost and the second garbage collection cost.

18 Claims, 10 Drawing Sheets

(52) U.S. Cl.
CPC .... *G06F 3/0608* (2013.01); *G06F 2212/1044* (2013.01)

(56) References Cited

U.S. PATENT DOCUMENTS

| | | | |
|---|---|---|---|
| 2014/0003142 A1* | 1/2014 | Lee | G11C 16/10 365/185.03 |
| 2015/0019796 A1* | 1/2015 | Byun | G06F 12/0246 711/103 |
| 2016/0283369 A1* | 9/2016 | Hada | G06F 12/0253 |

OTHER PUBLICATIONS

Lee et al. "BAGC: Buffer-Aware Garbage Collection for Flash-Based Storage Systems", IEEE vol. 62 No. 11 p. 2141 (Year: 2013).*

* cited by examiner

FIG.5
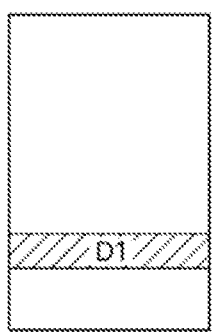 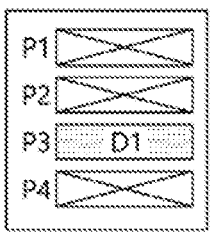 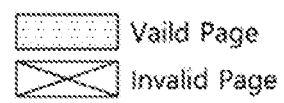
FIG.6
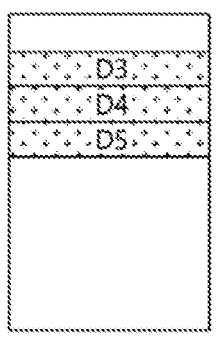 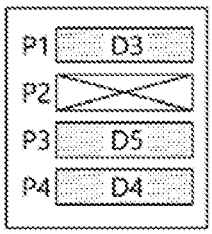 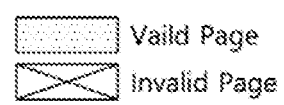

FIRST GARBAGE COLLECTION COST = Twr X VPC_tgblk1

SECOND GARBAGE COLLECTION COST = (Trd X VPC_tgblk2) + (Twr X VPC_tgblk2)

* Twr ; TIME FOR WRITING ONE PAGE IN THE SECOND REGION
* VPC_tgblk1 ; VALID PAGE COUNT OF THE FIRST TARGET BLOCK
* Trd ; TIME FOR READING ONE PAGE IN THE FIRST REGION
* VPC_tgblk2 ; VALID PAGE COUNT OF THE SECOND TARGET BLOCK

DATA STORAGE DEVICE AND METHOD FOR OPERATING THE SAME

CROSS-REFERENCES TO RELATED APPLICATION

The present application claims priority under 35 U.S.C. § 119(a) to Korean patent application number 10-2017-0087665, filed on Jul. 11, 2017, which is herein incorporated by reference in its entirety.

BACKGROUND

1. Technical Field

Various embodiments generally relate to a data storage device using a non-volatile memory device as a storage medium.

2. Related Art

Recently, a paradigm of a computer environment may be changed into a ubiquitous computing environment which allows users to access a computer system anywhere anytime. For this reason, the use of portable electronic devices, such as cellular phones, digital cameras, laptop computers and the like is surging. The portable electronic devices may include a data storage device using a memory device. The data storage device may be used for storing data used in a portable electronic device.

The data storage device using the memory device may have excellent stability and durability since it does not include a mechanical driving element. Also, the data storage device is advantageous in that it may access data quickly and consume a small amount of power. Non-limiting examples of a data storage device may include a universal serial bus (USB) memory device, a memory card having various interfaces, a universal flash storage (UFS) device, a solid stage drive (SSD), etc.

SUMMARY

In an embodiment, in a method for operating a data storage device including a non-volatile memory device including memory blocks in a first region and memory blocks in a second region, the method may include: storing data from a data cache memory in the memory blocks in the first region, the data cache memory configured to temporarily store the data received from a host device; determining a first garbage collection cost with respect to a first target memory block having the least valid page among the memory blocks in the first region in which the data are kept; determining a second garbage collection cost with respect to a second target memory block having the least valid page among the memory blocks in the first region from which the data are cleared; and performing a garbage collection operation to copy valid data of a garbage collection target memory block into the memory blocks in the second region in accordance with a comparison result of the first garbage collection cost and the second garbage collection cost.

In an embodiment, a data storage device may include: a non-volatile memory device including memory blocks in a first region and memory blocks in a second region; a data cache memory configured to temporarily store the data written by a request of a host device; and a control unit configured to control the non-volatile memory device for processing the request of the host device. The control unit may determine a first garbage collection cost with respect to a first target memory block having the least valid page among the memory blocks in the first region in which the data are kept, and determine a second garbage collection cost with respect to a second target memory block having the least valid page among the memory blocks in the first region. The control unit may perform a garbage collection operation to copy valid data of a garbage collection target memory block into the memory blocks in the second region in accordance with a comparison result of the first garbage collection cost and the second garbage collection cost.

According to example embodiments, the garbage collection operation of the data storage device may be optimized so that the data storage device may have a rapid operational speed.

BRIEF DESCRIPTION OF THE DRAWINGS

FIGS. 5 and 6 are block diagrams illustrating a method for processing data temporarily stored in a data cache memory in accordance with example embodiments.

DETAILED DESCRIPTION

Hereinafter, example embodiments will be described below with reference to the accompanying drawings through various examples of embodiments.

Figure 1:
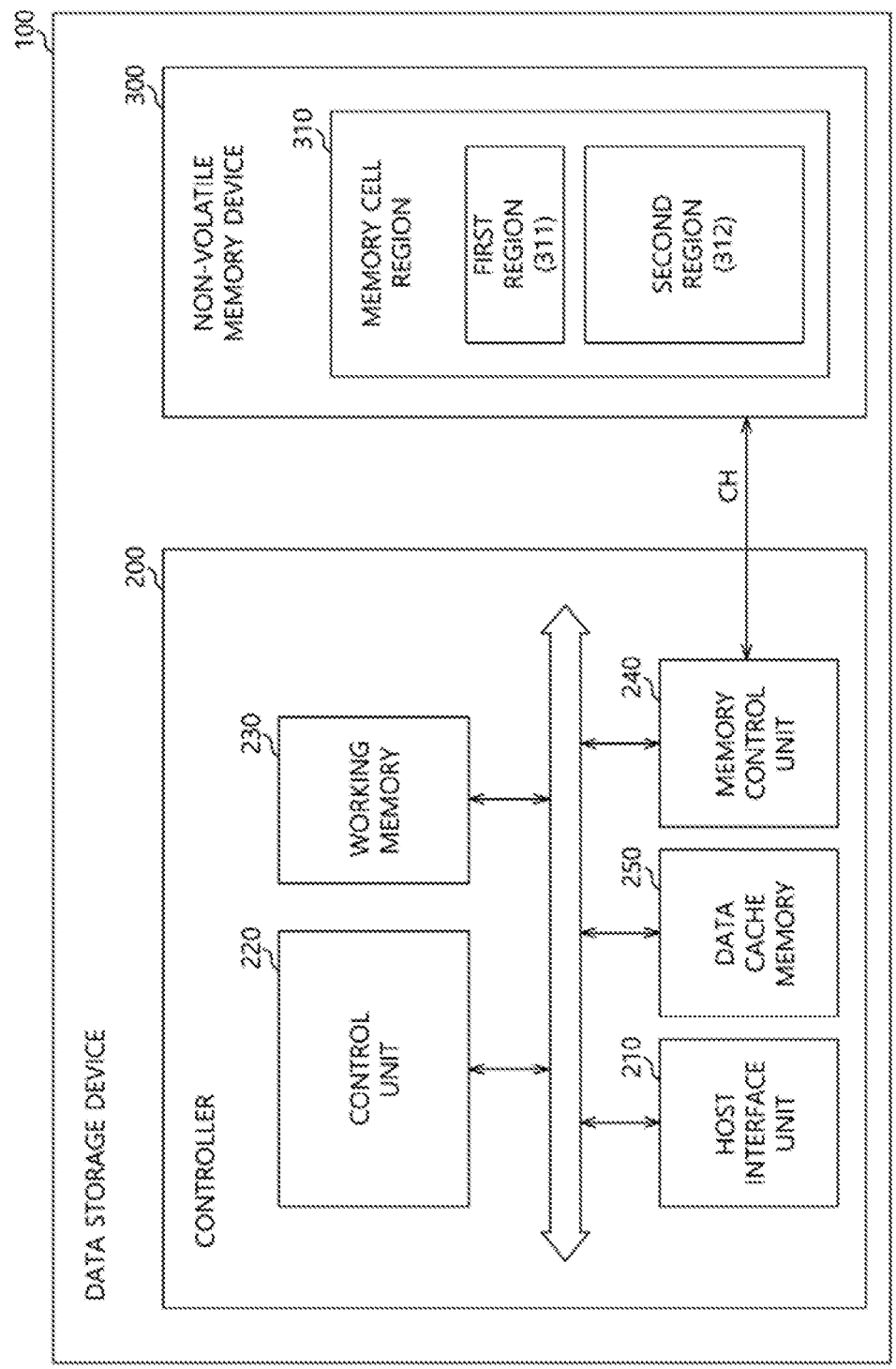
FIG. 1 is a block diagram illustrating a data storage device in accordance with example embodiments.

FIG. 1 is a block diagram illustrating a data storage device 100 in accordance with example embodiments.

Referring to FIG. 1, the data storage device 100 may be configured to store data accessed by a host device (not shown) such as a cellular phone, an MP3 player, a laptop computer, a desktop computer, a game machine, a television (TV), an in-vehicle infotainment system, etc. In some embodiments, the data storage device 100 may be referred to as a memory system.

The data storage device 100 may have various configurations in accordance with a host interface such as a transmission protocol with the host device. For example, the data storage device 100 may include a solid state drive (SSD), a multimedia card such as an MMC, an eMMC or a micro-MMC, a secure digital card such as an SD, a mini-SD or a micro-SD, a universal storage bus (USB), a universal flash storage (UFS), a personal computer memory card international association (PCMCIA) card, a peripheral component interconnection (PCI) card, a PCI-e (PCI express) card, a compact flash (CF) card, a smart media card, a memory stick, etc.

The data storage device 100 may have various package types. For example, the data storage device 100 may include a package on package (POP), a system in package (SIP), a system on chip (SOC), a multi chip package (MCP), a chip on board (COB), a wafer-level fabricated package (WFP), a wafer-level stack package (WSP), etc.

The data storage device 100 may include a controller 200 and a non-volatile memory device 300. The controller 200 may include a host interface unit 210, a control unit 220, a working memory 230, a memory control unit 240 and a data cache memory 250.

The host interface unit 210 may be configured to interface between the host device and the data storage device 100. For example, the host interface unit 210 may be communicated with the host device using a host interface such as any one of standard transmission protocols including a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI) and a PCI-e (PCI express).

The control unit 220 may include a micro control unit (MCU) and/or a central processing unit (CPU). The control unit 220 may be configured to process requests received from the host device. In order to process the request, the control unit 220 may be configured to drive a firmware such as a code type instruction or algorithm loaded into the working memory 230 and to control the functional blocks 210, 230, 240 and 250 and the non-volatile memory device 300.

The working memory 230 may include a memory such as a dynamic random access memory (DRAM) or a static random access memory (SRAM). The working memory 230 may be configured to store the firmware driven by the control unit 220. The working memory 230 may be configured to store data for driving software.

The memory control unit 240 may be configured to control the non-volatile memory device 300 under the control of the control unit 220. In some embodiments, the memory control unit 240 may be referred to as a memory interface unit. The memory control unit 240 may transmit control signals to the non-volatile memory device 300. The control signals may include commands, addresses, etc., for controlling the non-volatile memory device 300. The memory control unit 240 may transmit and receive the data to and from the non-volatile memory device 300.

The data cache memory 250 may be configured to temporarily store the data, which is received from the host device and is to be transmitted to the non-volatile memory device 300. That is, the data cache memory 250 may be operated as a write cache memory configured to temporarily store the data to be written by a request of the host device.

The non-volatile memory device 300 may be connected with the controller 200 through a channel CH including at least one signal line through which the commands, the addresses and the control signals may be transmitted. The non-volatile memory device 300 may be used as a storage medium of the data storage device 100.

The non-volatile memory device 300 may include at least one of a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, a resistive random access memory (RERAM) using transition metal oxide, etc.

The non-volatile memory device 300 may include a memory cell region 310 having a plurality of memory cells. The memory cell region 310 may include a first region 311 and a second region 312 classified in accordance with uses and operations. Memory cells in the first region 311 and the second region 312 may form a hierarchical memory cell set or memory cell unit such as a block and a page in accordance with an operational view, or a physical or structural view. For example, simultaneously read and written memory cells connected with a same word line may form a page. Simultaneously erased memory cells may form a memory block.

Figure 2:
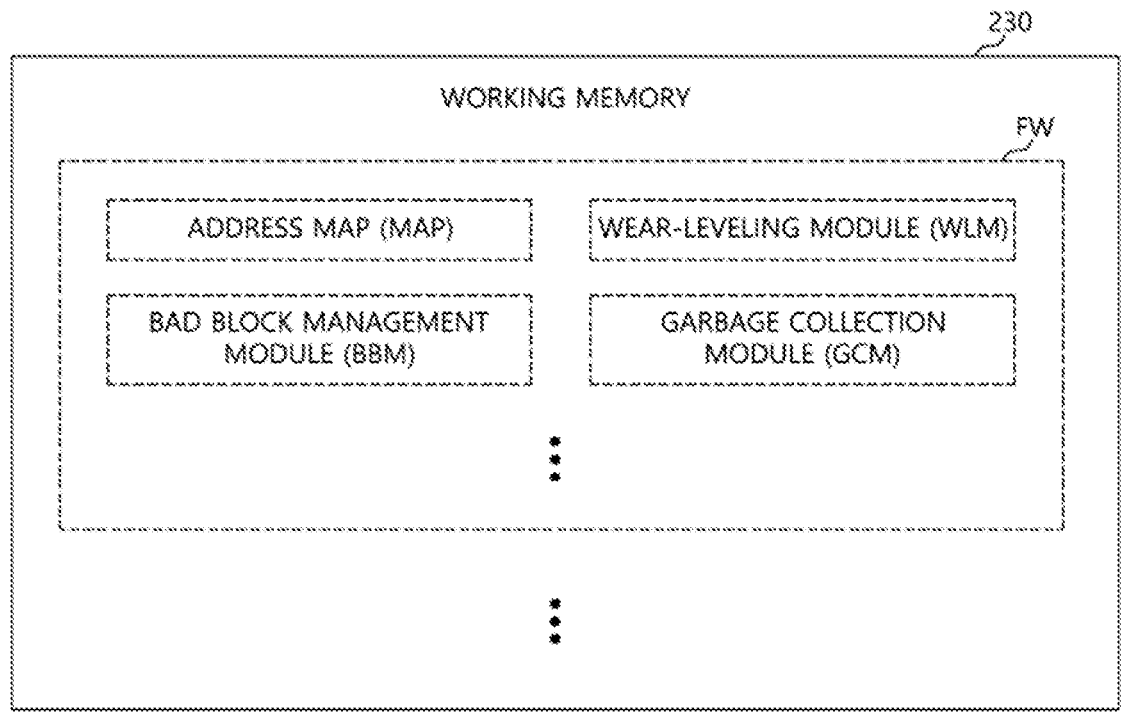
FIG. 2 is a block diagram illustrating a firmware loaded into a working memory in FIG. 1.

FIG. 2 is a block diagram illustrating a firmware loaded into the working memory 230 in FIG. 1. As mentioned above, the firmware loaded into the working memory 230 may be driven by the control unit 220.

Referring to FIG. 2, the firmware loaded into the working memory 230 may include modules configured to perform various functions and Meta data for driving the modules. For example, the firmware FW may include an address mapping table MAP, a wear-leveling module WLM, a bad block management module BBM and a garbage collection module GCM. Additionally, the firmware FW may further include modules such as an interleaving module configured to parallely operate the non-volatile memory device 300, a management module configured to prepare an unexpected power down, etc.

When the host device may access the data storage device 100, for example, when the host device may request a read operation or a write operation, the host device may provide the data storage device 100 with a logical address. The control unit 220 may convert or translate the logical address into a physical address of the non-volatile memory device 330. The control unit 220 may process the requested operation based on the physical address. In order to translate the logical address into the physical address, the firmware FW may include the address mapping table MAP.

The wear-leveling module WLM may be configured to manage a wear-level with respect to the memory blocks in the memory cell region 310 of the non-volatile memory device 300. The memory cells of the non-volatile memory device 300 may be aged due to the erase operation or the write operation. A defect may be generated in the aged memory cell, that is, the worn memory cell. The wear-leveling module WLM may manage so that each of the memory blocks has a similar erase-write count to prevent any one of the memory blocks from being relatively rapidly worn.

The bad block management module BBM may be configured to manage a defective memory block among the memory blocks in the memory cell region 310 of the non-volatile memory device 300. As mentioned above, the worn memory cell may have a defect. The data in the defective memory cell may not be normally read. Further, the data may not be normally written or stored in the defective memory cell. The bad block management module BBM may manage so that the memory block including the defective memory cell may not be used.

The erase operation of the non-volatile memory device 300 may require a long time. In order to improve an operational speed of the erase operation, the control unit 220 may store the data, which may be to be written in the memory cell in which the data may be written, to the erased memory cell. Thus, the valid data and the invalid data may be mixed in the non-volatile memory device 300 by the operation of the control unit 220. The garbage collection module GCM may perform a garbage collection operation to collect the valid data in a certain memory region such as a memory block and erase the invalid data.

Figure 3:
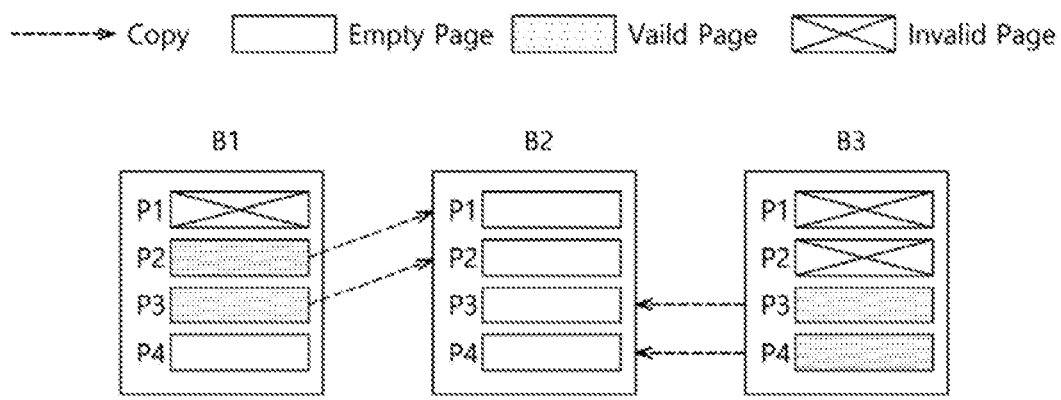
FIG. 3 is a block diagram illustrating a garbage collection operation performed by a garbage collection module in FIG. 2.

FIG. 3 is a block diagram illustrating a garbage collection operation performed by a garbage collection module in FIG. 2. In FIG. 3, each of the memory blocks B1~B3 may include four pages P1~P4. Numbers of the memory blocks and the pages included in each of the memory blocks in the memory cell region 310 may be variously changed.

When the garbage collection operation may be performed, the valid data of the memory blocks selected as a target of the garbage collection operation may be copied into an empty memory block. For example, the data in source pages P2 and P3 of the first memory block B1 as the target of the garbage collection operation may be copied into the empty memory block, that is, destination pages P1 and P2 of the second memory block B2. The data in source pages P3 and P4 of the third memory block B3 as the target of the garbage collection operation may be copied into destination pages P3 and P4 of the second memory block B2. The third memory block B3 in which the valid data may be copied may be erased so that the third memory block B3 is changed into an empty memory block.

The garbage collection operation may include the copy operation of the valid data into the empty memory block, that is, the read operation of the valid data and the write operation of the read data, and the erase operation of the memory block in which the valid data may be copied so that a resource of the controller 200 may be largely used up. Furthermore, the garbage collection operation may also require a long time. The garbage collection operation may be performed as an internal operation of the controller 200 in an idle time regardless of the read request or the write request of the host device, or in performing the request of the host device to secure an empty region. Therefore, the time for performing the garbage collection operation may be optimized to provide the data storage device 100 with a rapid operational speed and a rapid response speed with respect to the request of the host device.

Figure 4:
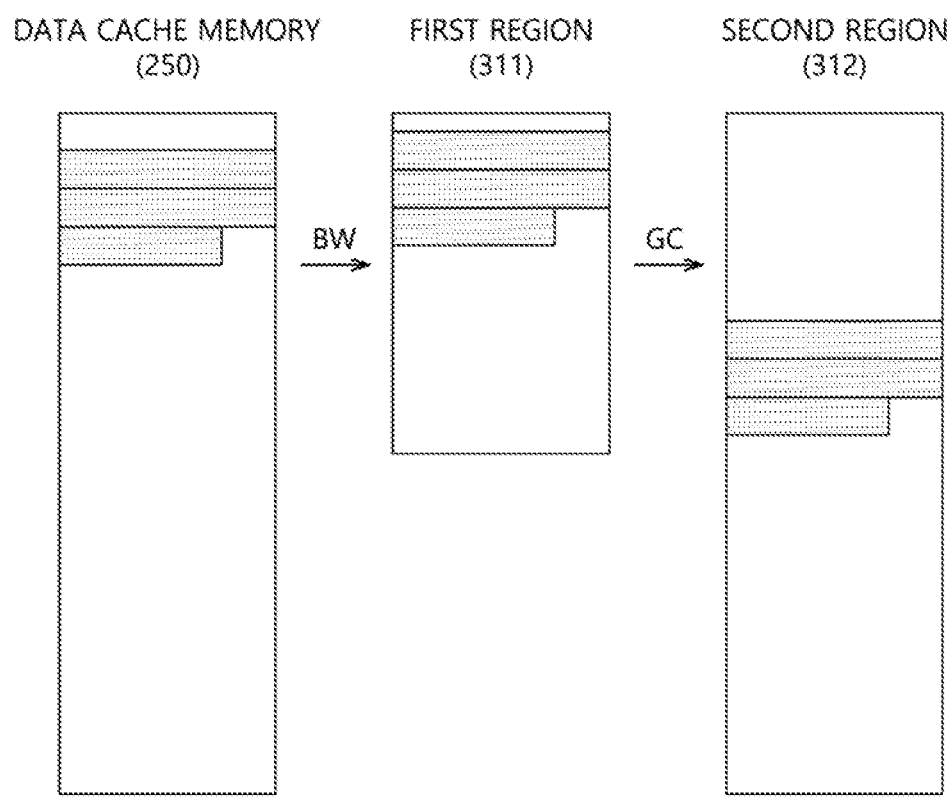
FIG. 4 is a block diagram illustrating a method for storing data in accordance with example embodiments.

FIG. 4 is a block diagram illustrating a method for storing data in accordance with example embodiments.

Referring to FIG. 4, the first region 311 of the non-volatile memory device 300 may include single level memory cells erased to have a threshold voltage corresponding to an erase state or programmed to have a threshold voltage corresponding to one program state. Alternatively, the first region 311 of the non-volatile memory device 300 may include multi level memory cells erased to have the threshold voltage corresponding to the erase state or programmed to have a threshold voltage corresponding to any one of the program states.

The second region 312 of the non-volatile memory device 300 may include multi level memory cells erased to have the threshold voltage corresponding to the erase state or programmed to have a threshold voltage corresponding to any one of the program states.

When the first region 311 may include the single level memory cells and the second region 312 may include the multi level memory cells, storable numbers of bits in the memory cell of the first region 311 may be less than storable bits in the memory cell of the second region 312. For example, when one-bit of data may be stored in the memory cell of the first region 311, at least two-bit of data may be stored in the memory cell of the second region 312. Further, when two-bit of data may be stored in the memory cell of the first region 311, at least three-bit of data may be stored in the memory cell of the second region 312.

Since the storable numbers of the bits in the memory cell of the first region 311 may be less than the storable numbers of the bits in the memory cell of the second region 312, the operational speed of the memory cell in the first region 311 may be faster than the operational speed of the memory cell in the second region 312. The controller 200 may sequentially store the data using a difference between the operational speeds of the memory cells in the first and second regions 311 and 312.

For example, in order to rapidly respond to the request of the host device, the data received from the host device may be primarily stored in the data cache memory 250 as the non-volatile memory. The temporarily stored data (shown by oblique lines) in the data cache memory 250 may be secondarily stored in the memory cells of the first region 311 by the operation of the buffer write (BW). The data in the memory cells of the first region 311 may be tertiarily stored in the memory cells of the second region 312 by the garbage collection operation GC. When the data is stored by the above-mentioned manners, the request of the host device may be rapidly processed.

FIGS. 5 and 6 are block diagrams illustrating a method for processing data temporarily stored in a data cache memory 250 in accordance with example embodiments. In FIGS. 5 and 6, the memory block of the first region may include the four pages P1~P4. Since the memory block may perform the buffer write operation, the memory block may be referred to as a buffer block. The buffer block is represented by 'BFBLKa' in FIG. 5, and is represented by 'BFBLKb' in FIG. 6.

A keeping reference value THk may be used for determining whether or not the data written in the buffer block may be kept in the data cache memory 250. The keeping reference value THk may be set by the control unit 220. The keeping reference value THk may be changed in accordance with sizes of the data cache memory 250. For example, when the data cache memory 250 may have a large storage capacity, the keeping reference value THk may be a high value. In contrast, when the data cache memory 250 may have a small storage capacity, the keeping reference value THk may be a low value. In this example embodiment, the keeping reference value THk may be three.

When all of the pages of the buffer block may be written, the numbers of the pages in which the valid data may be stored may be counted. Hereinafter, the numbers of the valid pages in the buffer block may be referred to as a valid page count VPC.

Referring to FIG. 5, since the third page P3 may be the valid page, the valid page count VPC of the buffer block BFBLKa may be set as "1" after all of the pages P1-P4 of the buffer block BFBLKa may be written. Referring to FIG.

6, since the first page P1, the third page P3 and the fourth page P4 may be the valid page, the valid page count VPC of the buffer block BFBLKb may be set as "3" after all of the pages P1~P4 of the buffer block BFBLKb may be written.

The data written in the buffer block may be cleared from the data cache memory 250 or kept in the data cache memory 250 in accordance with comparison results of the valid page count VPC of the buffer block and the keeping reference value THk. That is, when the valid page count VPC of the buffer block may be no less than the keeping reference value THk, the data written in the buffer block may be cleared from the data cache memory 250. In contrast, when the valid page count VPC of the buffer block may be below the keeping reference value THk, the data written in the buffer block may be kept in the data cache memory 250.

Referring again to FIG. 5, the data D1 written in the buffer block BFBLKa, which may have the valid page count VPC, that is, 1, below the keeping reference value THk, that is, 3, may be stored in the data cache memory 250 as well as the buffer block BFBLKa. The data D1 kept in the data cache memory 250 may be used in the garbage collection operation. Referring again to FIG. 6, the data D3, D4 and D5 written in the buffer block BFBLKb, which may have the valid page count VPC, that is, 3 of no less than the keeping reference value THk, that is, 3, may be stored in the buffer block BFBLKb. The data D3, D4 and D5 written in the buffer block BFBLKb may be cleared from the data cache memory 250.

Figure 7:
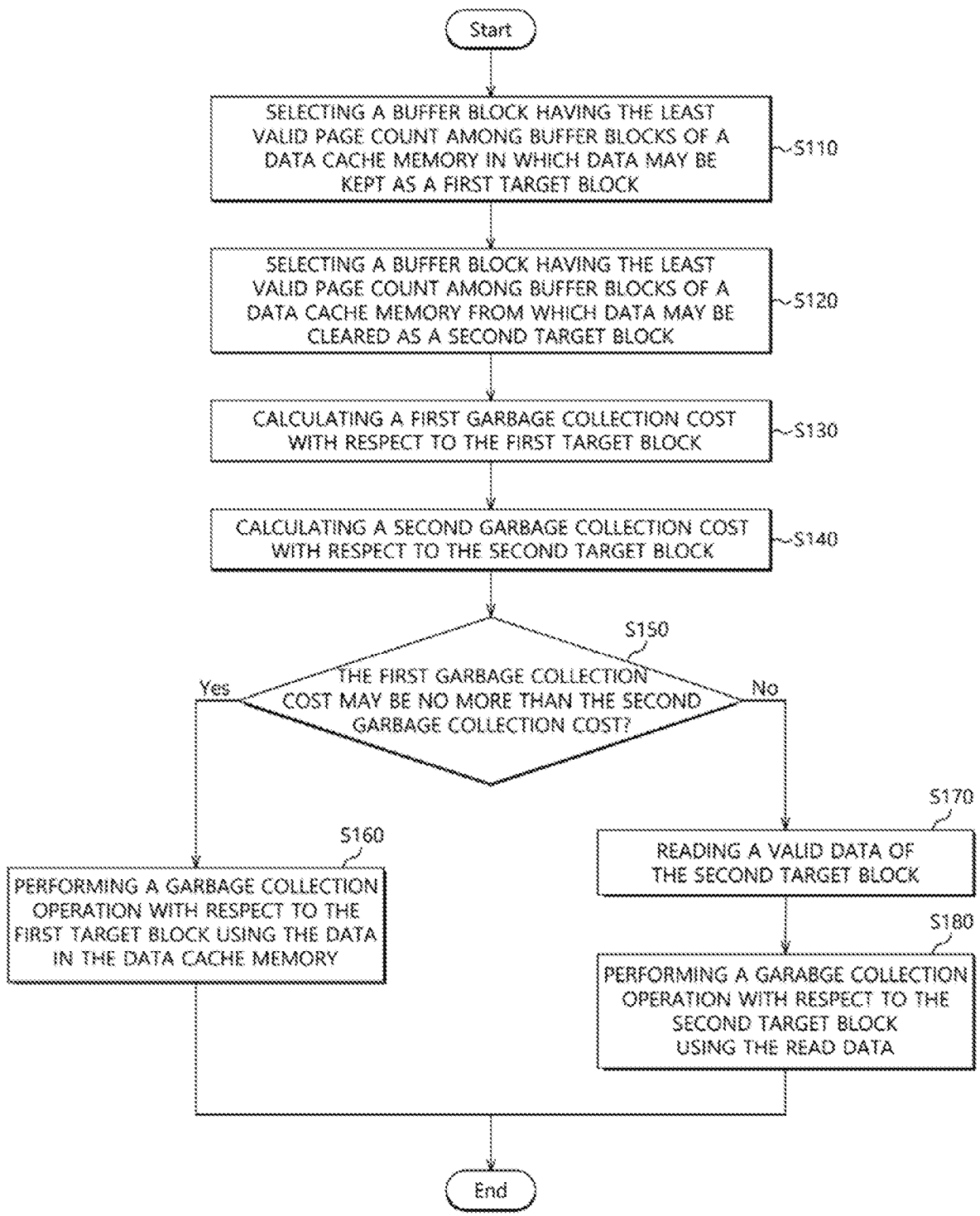
FIG. 7 is a flow chart illustrating a garbage collection operation of a data storage device in accordance with example embodiments.
Figures 8, 9:
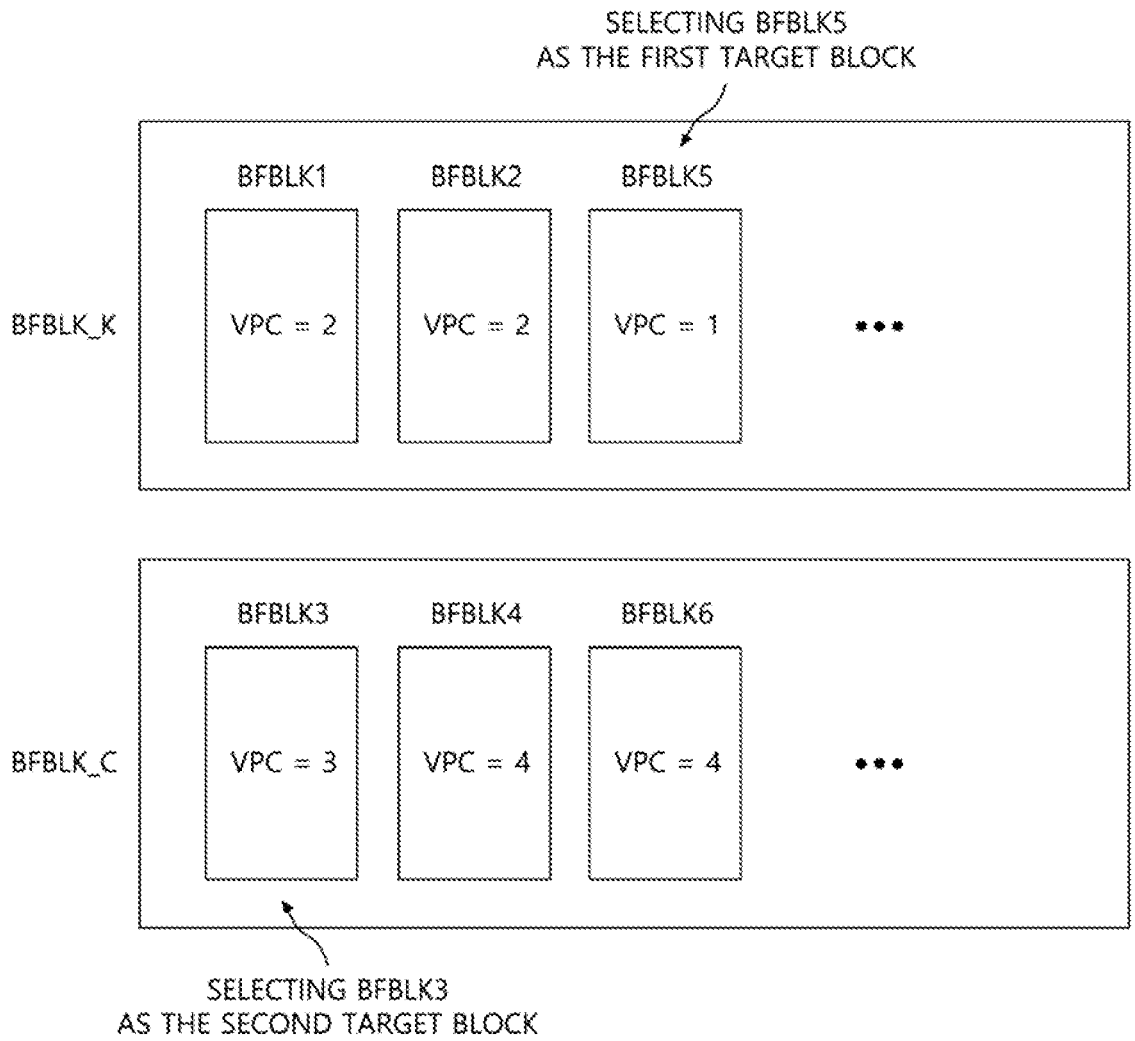
FIG. 8 is a block diagram illustrating buffer blocks of a data cache memory in which data may be kept and buffer blocks in a data cache memory from which data may be cleared in accordance with a comparison result of a valid page count and a reference value of each of the buffer blocks.
FIG. 9 is a diagram illustrating formulae for calculating a garbage collection cost in accordance with example embodiments.

FIG. 7 is a flow chart illustrating a garbage collection operation of a data storage device in accordance with example embodiments. FIG. 8 is a block diagram illustrating buffer blocks of a data cache memory in which data may be kept and buffer blocks in a data cache memory from which data may be cleared in accordance with a comparison result of a valid page count VPC and a keeping reference value THk of each of the buffer blocks. FIG. 9 is a diagram illustrating formulae for calculating a garbage collection cost in accordance with example embodiments.

Referring to FIGS. 7 to 9, in step S110, a buffer block having the least valid page count among the buffer blocks of the data cache memory in which the data may be kept may be selected as a first garbage collection target block hereinafter, referred to as a first target block.

In step S120, a buffer block having the least valid page count among the buffer blocks of the data cache memory from which the data may be cleared may be selected as a second garbage collection target block hereinafter, referred to as a second target block.

For example, as shown in FIG. 8, a fifth buffer block BFBLK5 having the least valid page count VPC among the buffer blocks BFBLK_K of the data cache memory in which the data may be kept may be selected as the first target block. A third block BFBLK3 having the least valid page count VPC among the buffer blocks BFBLK_C of the data cache memory from which the data may be cleared may be selected as the second target block.

In step S130, a first garbage collection cost with respect to the first target block may be obtained. The first garbage collection cost may be calculated by the formulae in FIG. 9. For example, the first garbage collection cost may be obtained by multiplying a time Twr for writing one page in the second region 312 and a valid page count VPC_tgblk1 of the first target block. Since the valid data of the first target block may be kept in the data cache memory 250, a time for reading the valid data of the first target block may have no influence on the first garbage collection cost.

In step S140, a second garbage collection cost with respect to the second target block may be obtained. The second garbage collection cost may be calculated by the formulae in FIG. 9. For example, the second garbage collection cost may be obtained by adding a multiplied value of a time Trd for reading one page as a source page in the first region 311 and a valid page count VPC_tgblk2 of the second target block to a multiplied value of a time Twr for writing one page as a destination page in the second region 312 and the valid page count VPC_tgblk2 of the second target block. Since the valid data of the second target block may be cleared from the data cache memory 250, a time Trd for reading the valid data of the second target block may have influence on the second garbage collection cost.

In step S150, it may be determined whether or not the first garbage collection cost may be no more than the second garbage collection cost. Since the valid page count VPC of the first target block may be below the keeping reference value THk and the valid page count VPC of the second target block may be no less than the keeping reference value THk, the probability that the first garbage collection cost may be lower than the second garbage collection cost may be higher. However, the data of the second target block may be invalided due to the data written by the request of the host device. Further, the valid page count VPC of the second target block may be decreased. Therefore, the first garbage collection cost may be compared with the second garbage collection cost.

When the first garbage collection cost may be no more than the second garbage collection cost, in step S160, the garbage collection operation with respect to the first target block may be performed using the data kept in the data cache memory 250. For example, the valid data of the first target block kept in the data cache memory 250 may be written in the destination page of the second region 312. Thus, when the first garbage collection cost may be no more than the second garbage collection cost, the operation for reading the valid data of the first target block may be omitted.

When the first garbage collection cost may be greater than the second garbage collection cost, in step S170, the valid data of the second target block may be read from the second target block. In step S180, the garbage collection operation with respect to the second target block may be performed using the read valid data of the second target block. For example, the read valid data of the second target block may be written in the destination page of the second region 312.

Figure 10:
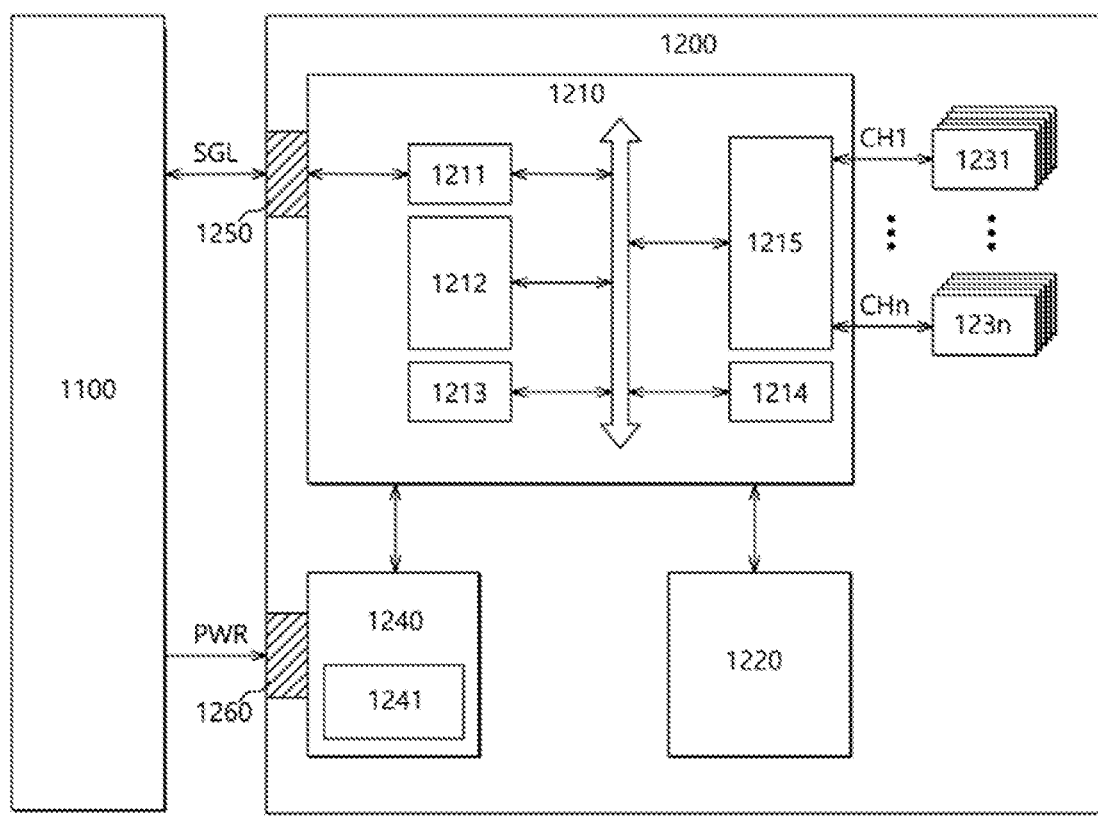
FIG. 10 is a diagram illustrating an example of a data processing system including a solid state drive in accordance with an embodiment.

FIG. 10 is a diagram illustrating an example of a data processing system 1000 including a solid state drive (SSD) 1200 in accordance with an embodiment. Referring to FIG. 10, the data processing system 1000 may include a host device 1100 and the SSD 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface between the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e) and universal flash storage (UFS).

The control unit 1212 may analyze and process the signal SGL inputted from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data for data to be transmitted to the nonvolatile memory devices 1231 to 123n. The generated parity data may be stored together with the data in the nonvolatile memory devices 1231 to 123n. The ECC unit 1214 may detect an error of the data read out from the nonvolatile memory devices 1231 to 123n, based on the parity data. If a detected error is within a correctable range, the ECC unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include at least one capacitor with a large capacity.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 11:
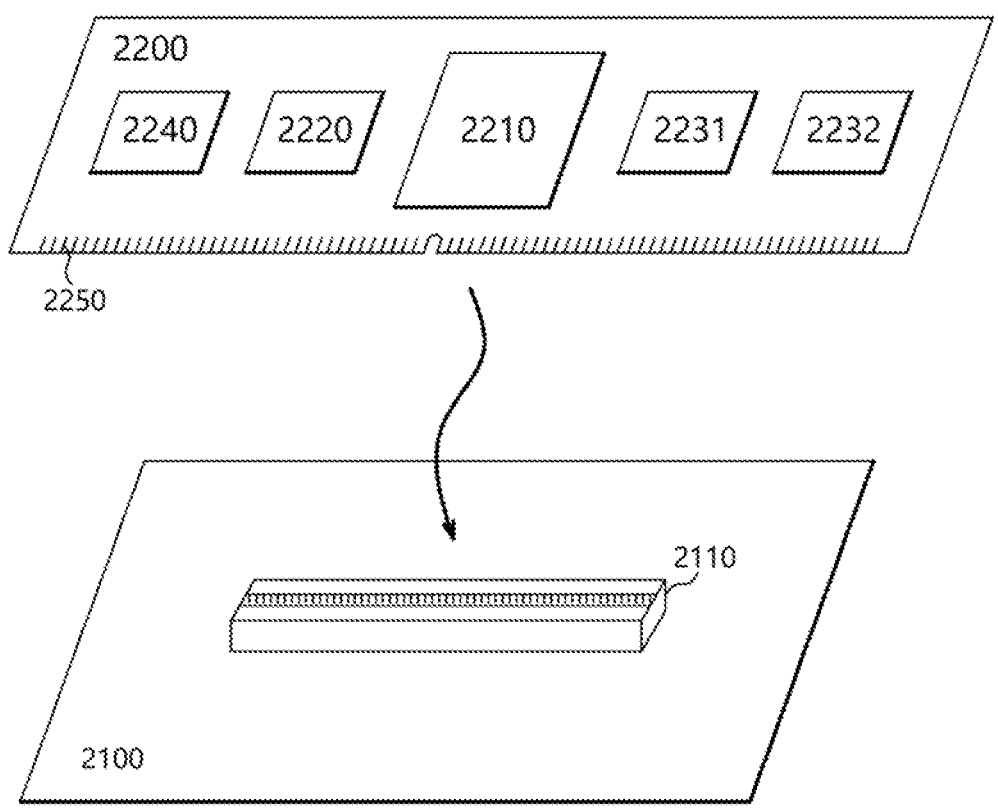
FIG. 11 is a diagram illustrating an example of a data processing system including a data storage device in accordance with an embodiment.

FIG. 11 is a diagram illustrating an example of a data processing system 2000 including a data storage device 2200 in accordance with an embodiment. Referring to FIG. 11, the data processing system 2000 may include a host device 2100 and the data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage medium of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 12:
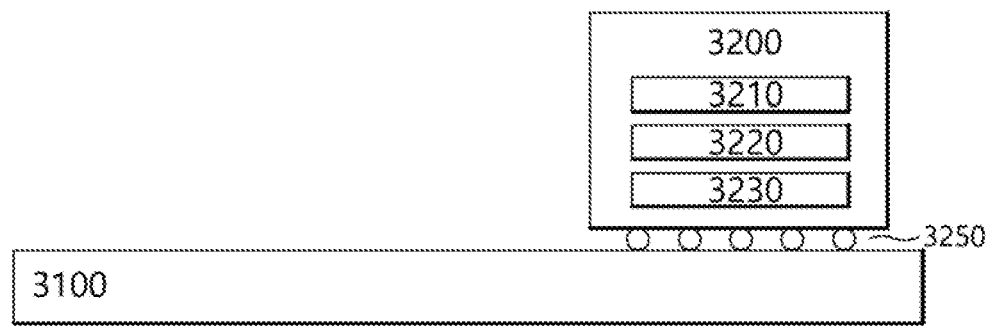
FIG. 12 is a diagram illustrating an example of a data processing system including a data storage device in accordance with an embodiment.

FIG. 12 is a diagram illustrating an example of a data processing system 3000 including a data storage device 3200 in accordance with an embodiment. Referring to FIG. 12, the data processing system 3000 may include a host device 3100 and the data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 13:
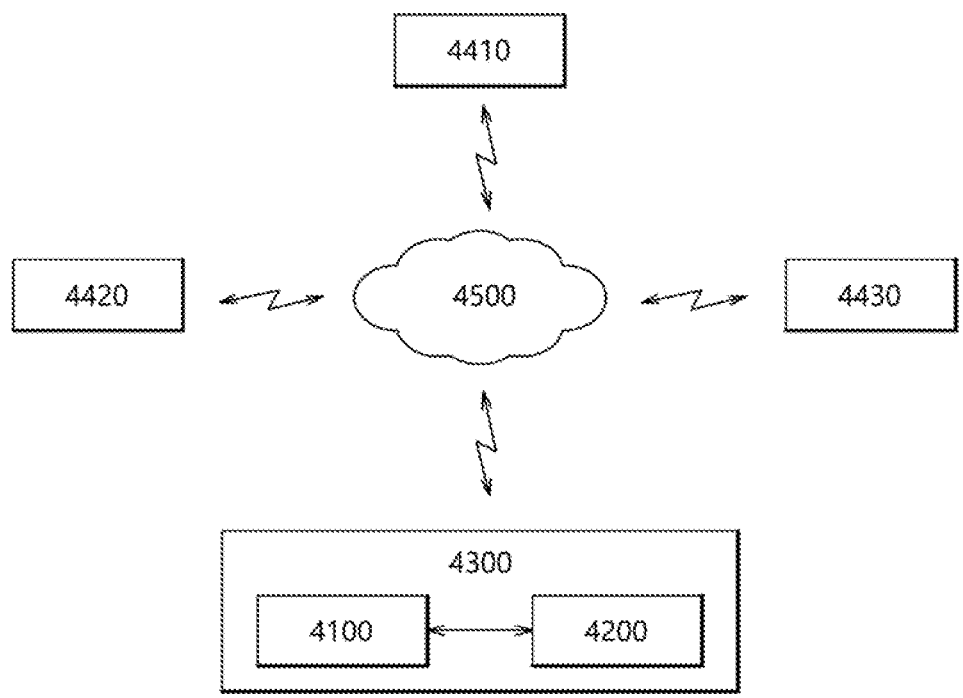
FIG. 13 is a diagram illustrating an example of a network system including a data storage device in accordance with an embodiment.

FIG. 13 is a diagram illustrating an example of a network system 4000 including a data storage device 4200 in accordance with an embodiment. Referring to FIG. 13, the network system 4000 may include a server system 4300 and a plurality of client systems 4410 to 4430 which are coupled through a network 4500.

The server system 4300 may serve data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured by the data storage device 100 shown in FIG. 1, the data storage device 1200 shown in FIG. 10, the data storage device 2200 shown in FIG. 11 or the data storage device 3200 shown in FIG. 12.

Figure 14:
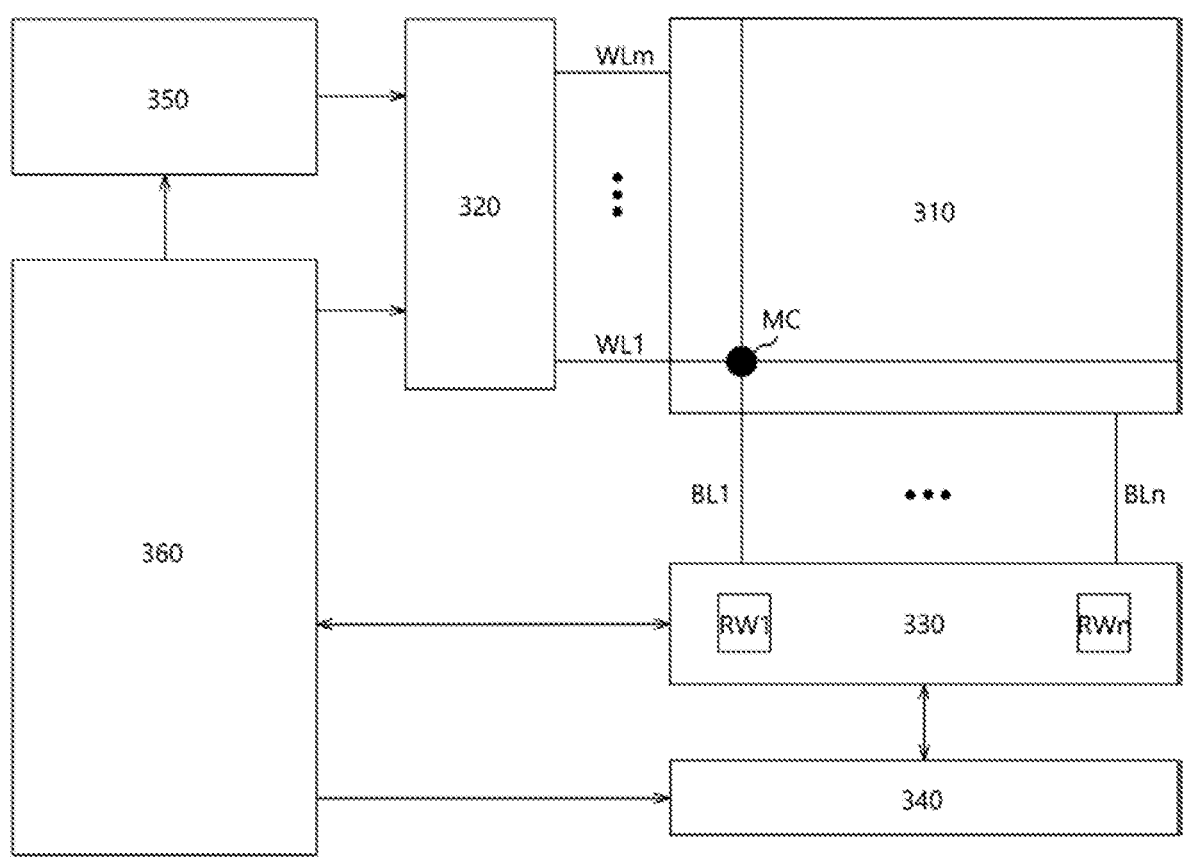
FIG. 14 is a block diagram illustrating an example of a nonvolatile memory device included in a data storage device according to an embodiment of the present disclosure.

FIG. 14 is a block diagram illustrating an example of a nonvolatile memory device 300 included in a data storage device according to an embodiment. Referring to FIG. 14, a nonvolatile memory device 300 may include a memory cell array 310, a row decoder 320, a column decoder 340, a data read/write block 330, a voltage generator 350, and a control logic 360.

The memory cell array 310 may include memory cells MC arranged in regions in which word lines WL1 to WLm and bit lines BL1 to BLn cross to each other.

The row decoder 320 may be coupled to the memory cell array 310 through the word lines WL1 to WLm. The row decoder 320 may operate through control of the control logic 360. The row decoder 320 may decode an address provided from an external apparatus (not shown). The row decoder 320 may select and drive the word lines WL1 to WLm based on a decoding result. For example, the row decoder 320 may provide a word line voltage provided from the voltage generator 350 to the word lines WL1 to WLm.

The data read/write block 330 may be coupled to the memory cell array 310 through the bit lines BL1 to BLn. The data read/write block 330 may include read/write circuits RW1 to RWn corresponding to the respective bit lines BL1 to BLn. The data read/write block 330 may operate according to control of the control logic 360. The data read/write block 330 may operate as a write driver or a sense amplifier according to an operation mode. For example, the data read/write block 330 may operate as the write driver configured to store data provided from an external apparatus in the memory cell array 310 in a write operation. In another example, the data read/write block 330 may operate as the sense amplifier configured to read data from the memory cell array 310 in a read operation.

The column decoder 340 may operate though control of the control logic 360. The column decoder 340 may decode an address provided from an external apparatus (not shown). The column decoder 340 may couple the read/write circuits RW1 to RWn of the data read/write block 330 corresponding to the bit lines BL1 to BLn and data input/output (I/O) lines or data I/O buffers, based on a decoding result.

The voltage generator 350 may generate voltages used for an internal operation of the nonvolatile memory device 300. The voltages generated through the voltage generator 350 may be applied to the memory cells of the memory cell array 310. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 360 may control an overall operation of the nonvolatile memory device 300 based on a control signal provided from an external apparatus. For example, the control logic 360 may control an operation of the nonvolatile memory device 300 such as a read operation, a write operation, an erase operation of the nonvolatile memory device 300.

The above embodiments of the present disclosure are illustrative and not limitative. Various alternatives and equivalents are possible. The examples of the embodiments are not limited by the embodiments described herein. Nor is the present disclosure limited to any specific type of semiconductor device. Other additions, subtractions, or modifications are obvious in view of the present disclosure and are intended to fall within the scope of the appended claims.

What is claimed is:

1. A method for operating a data storage device, the data storage device including a non-volatile memory device including memory blocks in a first region and memory blocks in a second region, the method comprising:
    storing data from a data cache memory in the memory blocks in the first region, the data cache memory configured to temporarily store the data received from a host device;
    counting numbers of valid pages of a memory block in which all of pages are written among the memory blocks in the first region;
    determining a first garbage collection cost with respect to a first target memory block having the least valid page in which data kept in the data cache memory is stored, among the memory blocks in the first region;
    determining a second garbage collection cost with respect to a second target memory block having the least valid page in which data cleared from the data cache memory is stored, among the memory blocks in the first region; and
    performing a garbage collection operation to copy valid data of a garbage collection target memory block into the memory blocks in the second region in accordance with a comparison result of the first garbage collection cost and the second garbage collection cost.

2. The method of claim 1, wherein performing the garbage collection operation comprises:
    selecting the first target memory block as the garbage collection target memory block when the first garbage collection cost is no more than the second garbage collection cost; and
    copying the valid data of the first target memory block kept in the data cache memory into the memory blocks in the second region.

3. The method of claim 1, wherein performing the garbage collection operation comprises:

selecting the second target memory block as the garbage collection target memory block when the first garbage collection cost is above the second garbage collection cost;

reading valid data from the second target memory block; and copying the read valid data of the second target memory block into the memory blocks in the second region.

4. The method of claim 1, wherein determining the first garbage collection cost comprises multiplying a time for writing one page in the second region and numbers of the valid pages of the first target block.

5. The method of claim 1, wherein determining the second garbage collection cost comprises adding a multiplied value of a time for reading one page in the first region and numbers of the valid pages of the second target block to a multiplied value of a time for writing one page in the second region and the numbers of the valid pages of the second target block.

6. The method of claim 1, further comprising keeping valid data of a memory block in which the numbers of the valid pages are below a reference value in the data cache memory.

7. The method of claim 1, further comprising clearing valid data of a memory block in which the numbers of the valid pages are no less than a reference value from the data cache memory.

8. A data storage device comprising:
a non-volatile memory device including memory blocks in a first region and memory blocks in a second region;
a data cache memory configured to temporarily store data written by a request of a host device; and
a control unit configured to control the non-volatile memory device for processing the request of the host device,
wherein the control unit is configured to:
determine a first garbage collection cost with respect to a first target memory block having the least valid page in which data kept in the data cache memory is stored among the memory blocks in the first region;
determine a second garbage collection cost with respect to a second target memory block having the least valid page in which data cleared from the data cache memory is stored among the memory blocks in the first region; and
perform a garbage collection operation to copy valid data of a garbage collection target memory block into the memory blocks in the second region in accordance with a comparison result of the first garbage collection cost and the second garbage collection cost,
wherein the control unit counts numbers of valid pages of a memory block in which all of pages are written among the memory blocks in the first region.

9. The data storage device of claim 8, wherein the control unit selects the first target memory block as the garbage collection target memory block when the first garbage collection cost is no more than the second garbage collection cost.

10. The data storage device of claim 9, wherein the control unit copies the valid data of the first target memory block kept in the data cache memory into the memory blocks in the second region.

11. The data storage device of claim 8, wherein the control unit selects the second target memory block as the garbage collection target memory block when the first garbage collection cost is above the second garbage collection cost.

12. The data storage device of claim 11, wherein the control unit reads valid data from the second target memory block, and copies the read valid data of the second target memory block into the memory blocks in the second region.

13. The data storage device of claim 8, wherein the control unit multiplies a time for writing one page in the second region and numbers of the valid pages of the first target block to determine the first garbage collection cost.

14. The data storage device of claim 8, wherein the control unit adds a multiplied value of a time for reading one page in the first region and numbers of the valid pages of the second target block to a multiplied value of a time for writing one page in the second region and the numbers of the valid pages of the second target block to determine the second garbage collection cost.

15. The data storage device of claim 8, wherein the control unit keeps valid data of a memory block in which the numbers of the valid pages are below a reference value in the data cache memory.

16. The data storage device of claim 8, wherein the control unit clears valid data of a memory block in which the numbers of the valid pages are not less than a reference value from the data cache memory.

17. The data storage device of claim 8, wherein the control unit uses memory cells in the memory blocks of the first region in a single level cell type and memory cells in the memory blocks in the second region in a multi level cell type.

18. The data storage device of claim 8, wherein the control unit stores two-bit of data in a memory cell included in the memory blocks of the first region and three-bit of data in a memory cell included in the memory blocks of the second region.

* * * * *